United States Patent
Cahill et al.

(10) Patent No.: US 8,027,441 B2
(45) Date of Patent: Sep. 27, 2011

(54) METHOD AND APPARATUS FOR PHONE TRACKING WITH DEFERRED REMOTE BILLING

(75) Inventors: Michael Cahill, San Rafael, CA (US); Jeremy Evans, Lafayette, CA (US); Dmytri Bazulin, Prevost (CA); Raymond Bradley, Walnut Creek, CA (US)

(73) Assignee: Sepialine, Inc., San Francisco, CA (US)

( * ) Notice: Subject to any disclaimer, the term of this patent is extended or adjusted under 35 U.S.C. 154(b) by 1184 days.

(21) Appl. No.: 11/799,278

(22) Filed: Apr. 30, 2007

(65) Prior Publication Data

US 2008/0267372 A1    Oct. 30, 2008

(51) Int. Cl.
*H04M 15/00* (2006.01)
(52) U.S. Cl. ............... 379/130; 379/114.03; 379/121.04
(58) Field of Classification Search ............. 379/111, 379/112.01, 114.01, 114.03, 114.05, 114.06, 379/114.09, 121.01, 121.04, 121.05, 122, 379/124, 127.01, 127.03, 127.04, 127.05, 379/130

See application file for complete search history.

(56) References Cited

U.S. PATENT DOCUMENTS

| | | | | |
|---|---|---|---|---|
| 5,301,223 A * | 4/1994 | Amadon et al. | ............... | 455/409 |
| 5,835,856 A * | 11/1998 | Patel | ............... | 455/406 |
| 5,943,406 A | 8/1999 | Leta | | |
| 5,960,069 A * | 9/1999 | Felger | ............... | 379/114.01 |
| 6,023,499 A * | 2/2000 | Mansey et al. | ............... | 379/111 |
| 6,044,138 A * | 3/2000 | Graham et al. | ............... | 379/114.03 |
| 6,625,267 B1 * | 9/2003 | Graham et al. | ............... | 379/114.03 |
| 7,130,070 B2 | 10/2006 | Evans et al. | | |
| 7,151,824 B1 * | 12/2006 | Bingaman et al. | ............... | 379/114.22 |
| 7,471,781 B2 * | 12/2008 | Bingaman et al. | ............... | 379/114.22 |
| 2001/0012346 A1 * | 8/2001 | Terry | ............... | 379/112.01 |
| 2005/0187839 A1 | 8/2005 | Butera | | |
| 2007/0088636 A1 | 4/2007 | Nault | | |

* cited by examiner

*Primary Examiner* — Binh Tieu
(74) *Attorney, Agent, or Firm* — Marcus C. Dawes; Daniel L. Dawes (57) ABSTRACT

A method of accounting for activities in a system comprising a telephone handset, including associating use of the telephone handset with a user, allowing the user to perform a call through use of the telephone handset without providing billing information relating to the call, communicating unbilled call information to at least one user computer associated with the user through a network, and prompting the user to input billing data relating to the unbilled call information at the at least one computer associated with the user.

22 Claims, 5 Drawing Sheets

METHOD AND APPARATUS FOR PHONE TRACKING WITH DEFERRED REMOTE BILLING

BACKGROUND OF THE INVENTION

1. Field of the Invention

The invention relates to tracking activities and costs on telephones and other devices.

2. Description of the Prior Art

Cost recovery software are used to capture office expenses, such as print, copy, phone, scan, and fax activities. Conventionally, call accounting is performed entirely on a telephone handset. Using complex configurations at the telephone exchange or switch, handsets are programmed to require users to key in a code to bill a telephone call. Accounting is conventionally enforced by disabling or preventing use of the telephone until billing information is entered.

Figure 1:
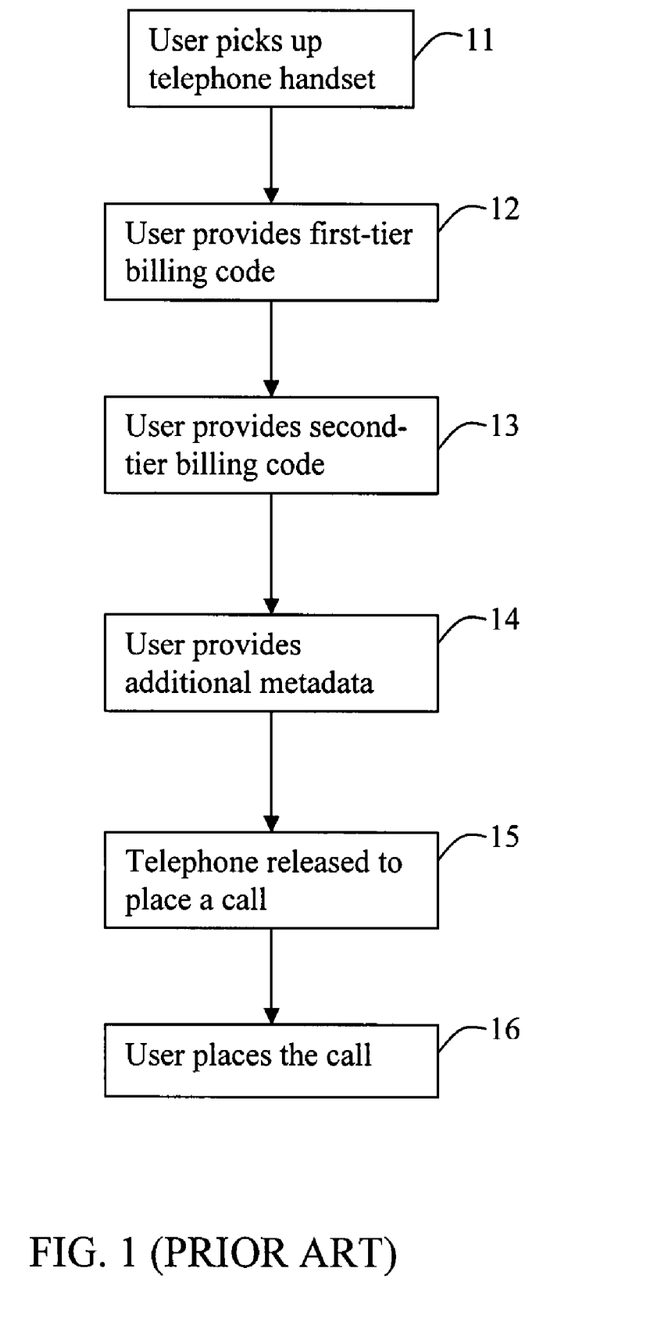
FIG. 1 is a flowchart illustrating a conventional billing method.

The conventional method is illustrated in FIG. 1, and typically includes the following steps:

a. In step 11, a user picks up a telephone handset. An unusual dial tone may be used for indicating that the telephone is not yet ready to place a call, and that billing information is required.

b. In step 12, the user provides first-tier billing code (e.g. project, client, etc.)

c. In step 13, the user provides second-tier billing code (e.g. phase, matter, etc.)

d. In step 14, the user provides additional metadata (billable/non-billable, reason, etc.)

e. In step 15, the telephone is released to place a call. Dial tone may change at this point.

f. In step 16, the user keys in a telephone number and places the call.

Many telephone systems lack the capability to pre-load a list of valid accounting codes. Hence, many call accounting systems are "free form," allowing users to key in arbitrary and potentially invalid accounting information.

Some prior art systems do allow validation. However, they cannot offer much in the way of feedback. Many handsets lack a display, and thus must rely on audio feedback (e.g. "three rapid beeps" means invalid code) to indicate the status of the handsets. Handsets with small LCD displays can offer basic text prompts, but little more. No search mechanism is typically present to locate accounting data, leaving the user to perform a lookup or search elsewhere, or to memorize what are often lengthy numeric codes.

The above-described pre-billed model found in prior art requires that all accounting data are entered by the user before the telephone is unlocked. This model is self-enforcing in that users must respond to all questions (possibly inaccurately) in order to gain access to a telephone line. Failure to respond to prompts, or failure to supply valid responses to prompts, will result in denial of access to the equipment.

Telephone accounting that employs the traditional workflow described above is highly unpopular among end users. The number of mandatory steps, coupled with the absence of a search and feedback mechanisms, frustrates end users. Many companies employ an "administrator override" billing code (e.g. "99999"). These override codes often become common knowledge, and users eventually use it in lieu of the correct billing code in order to avoid frustration and lost productivity.

BRIEF SUMMARY OF THE INVENTION

In accordance with an embodiment of the invention, a method of accounting for activities in a system having a telephone handset includes associating use of the telephone handset with a user, allowing the user to perform a call through use of the telephone handset without providing billing information relating to the call, communicating unbilled call information to at least one user computer associated with the user through a network, and prompting the user to input billing data relating to the unbilled call information at the at least one computer associated with the user.

In accordance with another embodiment of the invention, an apparatus of accounting for call activities on a telephone handset includes means for associating use of the telephone handset with a user, means for allowing the user to perform a call through use of the telephone handset without providing billing information relating to the call, means for communicating unbilled call information to at least one user computer associated with the user, through a network, and means for inputting billing data relating to the unbilled call information at the at least one user computer.

In accordance with another embodiment of the invention, a computer readable medium containing instructions for accounting for activities in a network including a telephone handset and a computer, the instructions include associating the telephone handset with a user, and prompting the user to provide accounting information from at least one computer associated with the user, for a call made by the user after the call is completed.

While the apparatus and method have been or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION

As described in U.S. Pat. No. 7,130,070, which is assigned to the assignee of the present application and is incorporated herein by reference in its entirety, an office expense is tracked at the point on the computer or communication network where it occurs, such as a print server, copy machine, fax machine, etc. Using an asynchronous transport mechanism, data about the expense item is routed to the desktop of the user responsible for accounting or controlling the use or cost. Based on rules established in the software, the user is then prompted to allocate the expense to an accounting code, such as a project, client, department, etc.

A telephone handset is a unit of office equipment that allows a user to communicate with another user at a different location. It must be understood that any kind of handset is equivalently included, e.g. land-line telephones, cell phones, radios, or text messaging devices, without limitation.

Figure 2:
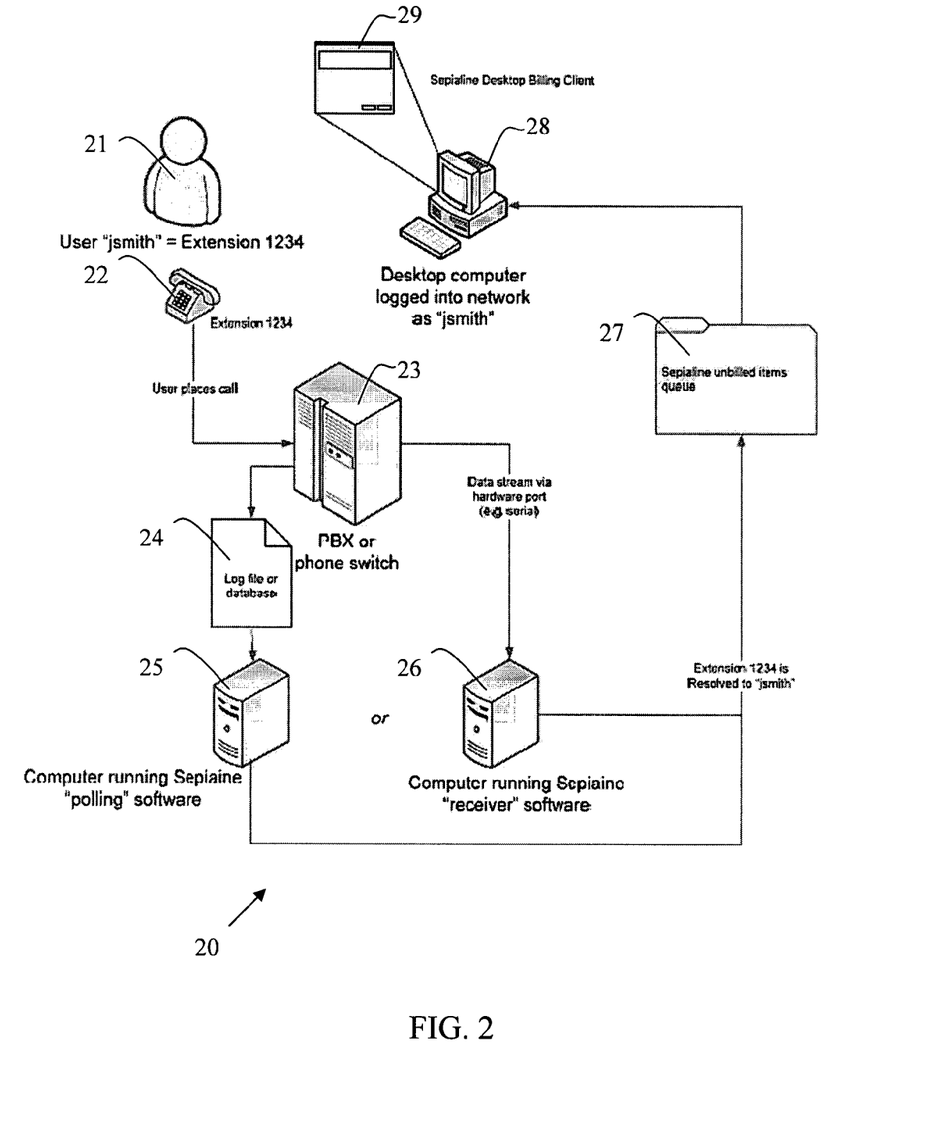
FIG. 2 is a diagram of a network in accordance with embodiments of the invention.

A system in accordance with some embodiments of the invention is illustrated in FIG. 2. A user 21, for example, having a login name "jsmith" and an assigned telephone extension 1234, picks up his or her telephone 22 and makes a phone call. The call goes through a private branch exchange (PBX) or phone switch 23.

Most relatively modern telephone switches have a mechanism for logging or auditing activities. If this is the case, the phone switch 23 generates a log file to be saved on a server 25 which is running a "polling" software, which periodically polls the log or database for new activities since the last poll. Polling intervals can be relatively frequent, e.g., 10 seconds. The software may be stored in a computer readable medium such as memory, a compact disk, a floppy disk, a hard drive, a magnetic tape, a flash memory, etc.

Older equipment exposes a hardware serial port, to which an external computer must be attached via a cable. In this case, call logging is "streamed" out the hardware port and must be captured in real time. Data stream from the phone switch 23 goes through a hardware port, for example, a serial port, to a server 26 which is running a "receiver" software.

When a new call activity is detected, some key properties of the call are extracted, such as the telephone number, being inbound or outbound, telephone extension, time and duration of the call, etc.

Cost of the call may be additionally calculated based on these properties such as the distance of the call. To derive a cost and charge for a telephone call, in accordance with an embodiment of the invention, the duration of the telephone call and the general geographical location to which the phone call was made (or from which it was received) are measured. Cost can be established separately for inbound and outbound calls. Alternatively, a customer may elect to only account for outbound, and not for inbound, calls, or vice versa.

Most prior art systems determine the geographical location of the telephone call on the basis of the telephone area code. Cost is, therefore, tied to area codes and, in some cases, even further decomposed to the telephone exchange level (the first three digits after the area code). With hundreds of area codes in the United States alone, this results in a convoluted and complex costing algorithm that requires frequent maintenance and updates due to the ever-changing nature of area codes, phone exchanges and phone numbers.

In accordance with some embodiments of the invention, cost calculations are simplified by classifying each phone call into one of three categories: local, long distance, or international calls. Local calls are those without the need of dialing an area code, or whose area code matches the customer's "home" area code, as specified in a user-determined software configuration. Embodiments of the invention also allow an administrator to selectively configure international dialing prefixes, which are used to identify international phone calls according to user-determined administrative accounting criteria.

Data from server 25 or server 26 are resolved to user "jsmith," e.g., through a mechanism for mapping telephone extensions to computer usernames, and are sent to an unbilled items queue 27, which shows up in the user's 21 desktop computer 28, which is logged on as "jsmith," as a Desktop Billing Client (DBC) 29.

Figure 3:
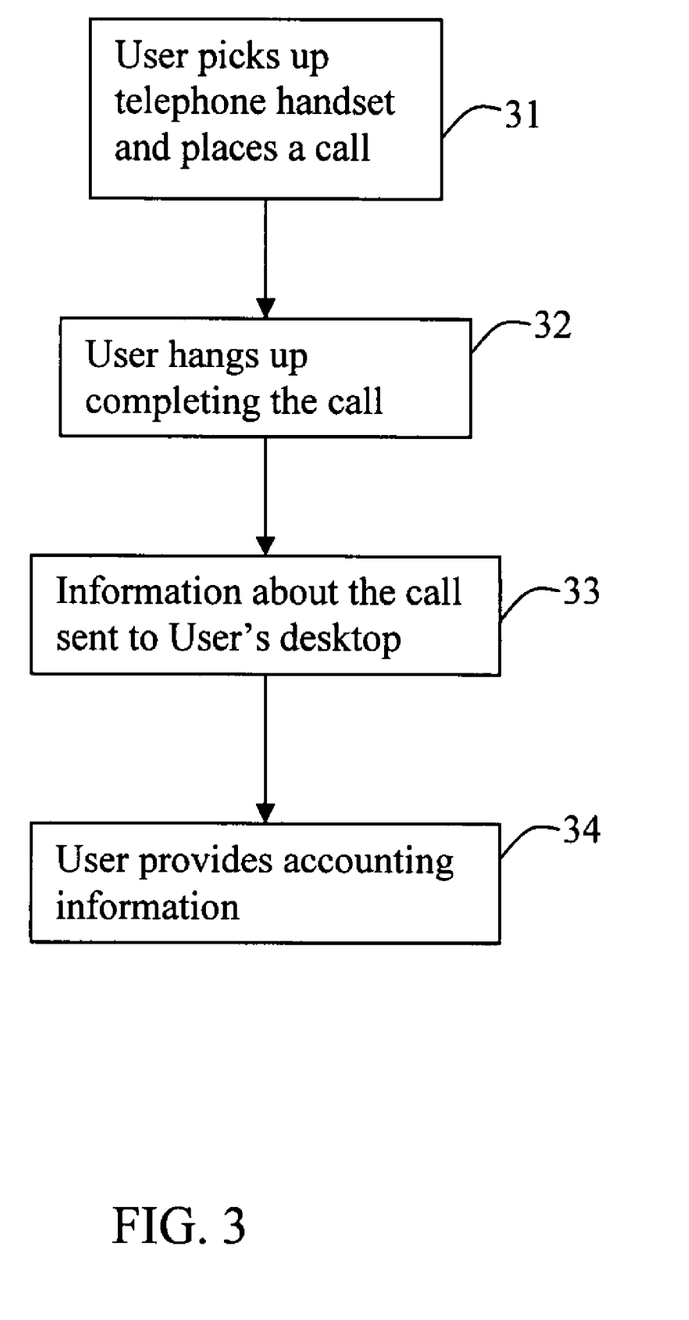
FIG. 3 is a flowchart illustrating a method in accordance with an embodiment of the invention.

Embodiments of the invention have a fundamentally different workflow from those described in the prior art. For example, the method of the illustrated embodiment, as shown in the flowchart of FIG. 3, comprises the steps:
   a. User 21 picks up a handset and places a telephone call in step 31.
   b. User 21 hangs up completing the call in step 32.
   c. Information about the unbilled call activity (e.g., extension, local, long distance or international, and duration) is routed to the responsible user's desktop via a message queue in step 33, similar to that described in U.S. Pat. No. 7,130,070.
   d. In step 34, at his or her desktop computer 14, the user is presented with a billing interface, in which he or she provides accounting information in one or more input fields on a single screen. Additional or fewer input screens or drop down input lists and fields could be included or excluded, if needed.

Hence, the illustrated embodiment of the invention is described as "telephone call tracking with deferred remote billing." In contrast to the "hostage" and "quarantine" enforcement methods in the prior art, embodiments of the present invention have a "nag" enforcement method. This enforcement method allows the job to pass unhindered from the client computer to the server, and then to the device where the job is performed.

In an office environment, some telephones cannot be associated with a specific person. Examples would include telephones in conference rooms, shared offices, lunch rooms and other "common" areas. Tracking calls made in such locations requires a slightly different workflow, for example:
   (1) User 21 picks up handset and is prompted to input his or her user id or desk telephone extension.
   (2) Telephone line is released. User 21 places telephone call as normal.
   (3) User 21 hangs up and completes the call.
   (4) Information about the unbilled call activity (e.g. extension, duration) is routed to the responsible user's desktop—based on the supplied user id value—via a message queue similar to that described in U.S. Pat. No. 7,130,070.
   (5) User 21 is presented with a billing interface at his or her computer, in which he or she provides accounting information.

The workflow described above is predicated on telephone switch equipment that can perform the prompt specified in the first step, at selected telephones. Ideally, this prompt would only be present on semi-public telephones; the users' individual desktop telephone would not require this prompt.

It should be noted that in accordance with an embodiment of the invention having an asynchronous approach, the act of writing data about a call to a database preferably takes place when the billing data is supplied; this contrasts with some systems in which the writing of data may or may not occur at or near the time when the call information is extracted and stored. In the asynchronous model, the moment that the factual information concerning a call is extracted, it is recorded in a message queue. The user 21 is then prompted to supply additional billing information.

Thus, in accordance with embodiments of the invention, a phone call remains a native process, and takes a "hands-offthe-job-process" approach that makes few if any modifications to the process of performing the call. Thus, fewer restrictions are imposed upon users 21 while a reliable record of call events for cost allocation and recoupment is maintained.

Figure 4:
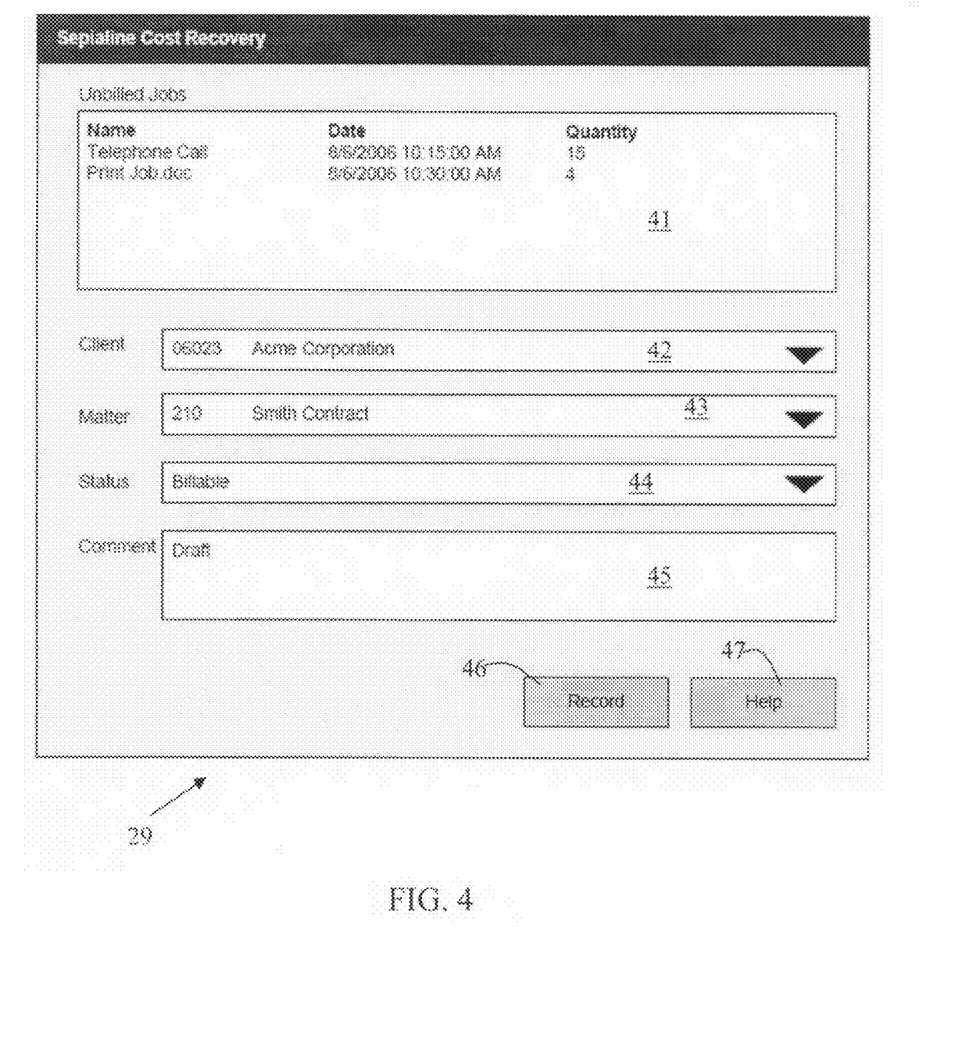
FIG. 4 is the data billing client (DBC) screen display of the user's computer in accordance with an embodiment of the invention.

Consider now the user interface at the desktop 28. When a user 21 completes a telephone call, that user 21 is identified on the computer network via his telephone extension. A DBC 29 as shown in FIG. 4 is displayed on the computer(s) where the identified user 21 is logged in. The DBC 29 prompts the user 21 to supply accounting information as defined by a system administrator. Unlike the prior art workflow described earlier, in which accounting data is entered serially through a sequence of onscreen pages, the DBC 29 prompts for all required values in parallel.

When a user 21 picks up a telephone handset, the telephone and/or the user 21 is identified, based on the telephone itself (e.g., in the case of a "private" telephone) or on the code input by the user 21 (e.g., in the case of a "public" telephone). A DBC 29 as shown in FIG. 4 is displayed on the screen or display of the computer(s) 28 where the identified user is logged in. DBC 29 may be generated by software resident on user computer 28, and may be controlled by client billing software modules in server 25 or 26 where a cost accounting database is being assembled, as described in greater detail in U.S. Pat. No. 7,130,070.

The DBC 29 prompts the user to supply accounting information as defined by a system administrator. Unlike the prior art workflow, the DBC 29 prompts for all required values in parallel as depicted in the screen display of FIG. 4. In other words, the billing data may be input, corrected and re-input in any order into the windows 42-45. In the illustrated embodiment, unbilled jobs appear in window 41 as collected by server 25 or 26 for user desktop 28. The client or job to be billed is entered by the user into window 42, the matter or sub-job to be billed in window 43, the status of the billed charged into window 44 and other comments into window 45. Windows 42-44 are drop-down windows as indicated by the down arrow in the right end of the window so that only approved inputs are possible for input.

A drop-down list is a user interface element found in computer software that eliminates the possibility of selecting an item not in a predefined list. Hence, unlike the scenario, where a user 21 has supplied an invalid response and receives only a prominent screen notice of invalid entry, the DBC 29 does not allow the user 21 into such a state.

Further, the primary billing code drop-down list in the DBC 29 implements an "auto-complete" search. In this mechanism, a user is permitted to type letters or numbers into the user interface, and the dropdown list nearly instantly locates the one or more items matching the typed letters.

When all the data are entered and deemed correct by the user 21, the record button 46 is clicked. A help button 47 is provided for assistance whenever needed. It should be understood that the DBC 29 of FIG. 4 is illustrative only, and that many other arrangements and inputs could be provided without departing from the scope of the invention.

The various prompts on the DBC 29 are configured by an administrator. Configurable elements illustratively include:
 a. Which data prompts are visible?
 b. Which data prompts are required?
 c. What are acceptable values for each prompt?
 d. What is the name of the prompt (e.g. "Client/Matter", "Project/Phase")

The illustrated embodiment of the invention allows the end user to provide accounting data for a variety of different types of activity. DBC 29 can be arranged and configured by the administrator in a wide variety of ways to meet the accounting needs of the specific situation, including having a different configuration and/or inputs possible for different clients and matters. FIG. 4, for example, illustrates the DBC 29 prompting the user to account for both a telephone call of 15 minutes, and a subsequent computer print job of 4 pages. The DBC 29 can prompt users from a variety of activities, including:
 a. Print
 b. Copy
 c. Scan
 d. Fax
 e. Three-dimensional printers
 f. Laser cutters
 g. Telephone calls
 h. Computer disk drive storage
 i. Employee time This list is not exhaustive and may be arbitrarily altered or expanded to meet the needs of the user's situation, not only in an office, but in any type of setting including order fulfillment, warehousing, manufacturing, routing and other job situations without limitation. No other prior art system supports multiple activity types in a single user interface.

Because embodiments of the present invention do not require accounting data beforehand, but rather allow users to place telephone calls without supplying accounting information, some other enforcement mechanism must be provided to insure proper accounting data input.

A quota, defined by a system administrator, determines how many unbilled jobs can exist for a given user before a mandatory billing interface is displayed. While a given user's unbilled job count is below the quota, the user may recall the billing interface at his or her discretion. The user 21 may thus delay the entry of the required billing information to a convenient time, but cannot avoid entering the information and cannot indefinitely delay the entry of the information to a point where the user 21 may no longer recall the pertinent information. Enforcement is preferably accomplished once the quota is reached by obscuring the computer screen with the billing interface, which cannot be removed or moved. Though other processes on the client computer are not interrupted, the user 21 is essentially unable to use the computer without sufficiently addressing, then dismissing, the billing interface. In some cases, the quota is merely one activity, i.e., the user 21 is required to take care of the billing of once after a single phone call is made.

Figure 5:
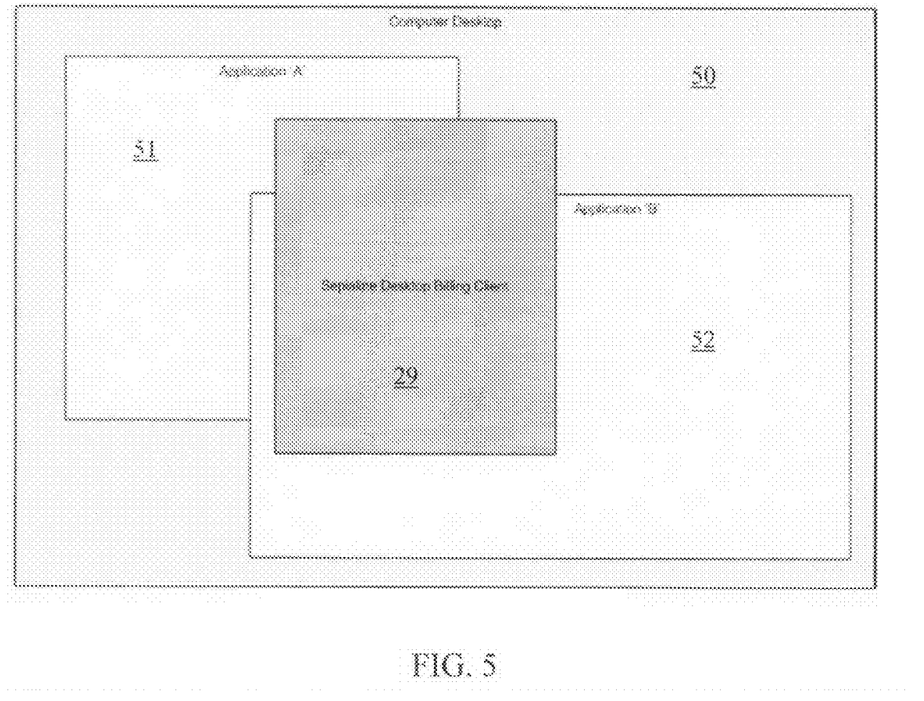
FIG. 5 is a screen display of the user's computer illustrating an enforcement method in accordance with an embodiment of the invention.

As shown in FIG. 5, in accordance with an embodiment of the invention, the DBC 29 enforces the accounting rules at the user's computer desktop 50 by remaining topmost, meaning that it conceals some or all of any other software applications such as Application "A" 51 and Application "B" 52 running on the screen. The DBC 29 obscures a sufficient amount of the computer desktop screen to impede use of the computer desktop 50 without first responding to the required prompts of the DBC 29. Further, in accordance with some embodiments of the invention, the DBC window 29 cannot be moved to a different location on the screen, closed, or dismissed.

Advantageously, the capability of tracking telephone call activities without supplying information before the phone call minimizes memorization and user intervention at the point of work, leading to a smoother workflow and a more pleasant user experience. Subsequently, accountability is maintained through a desktop component that at once enforces the system and also prompts the user for required information in parallel.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of automatically accounting for activities in a system comprising a telephone handset, comprising:
   automatically associating use of the telephone handset with a first user;
   allowing the first user to perform a call through use of the telephone handset without providing billing information relating to the call;
   automatically collecting data concerning the nature of the call;
   automatically determining a cost for making the call, defined as unbilled call cost information;
   communicating the unbilled call cost information related to the cost of making the telephone call automatically to at least one computer associated with the first user through a network, the at least one computer and telephone handset being without restriction with respect to physical proximity to each other; and
   prompting a billing user, who may or may not be the first user, to input billing data into a billing database, which billing data is related to the cost information which was automatically communicated to the at least one computer associated with the first user and which automatically communicated cost information is made available at least in part to the billing user for input of the billing data.

2. The method of claim 1 wherein automatically associating use of the telephone handset with the user comprises identifying the telephone handset, automatically associating the telephone handset with the user, automatically associating the telephone handset with a computer username, automatically associating a code input in the telephone handset with the user, and automatically associating the user with a computer username.

3. The method of claim 1 further comprising inputting billing data relating to the unbilled call cost information into a single input screen.

4. The method of claim 1 further comprising inputting billing data relating to the unbilled call cost information in parallel into one or a plurality of data input windows.

5. The method of claim 4, wherein inputting billing data relating to the unbilled call cost information in parallel into a plurality of data input windows comprises inputting billing data relating to the unbilled call cost information in at least one input window that is a drop-down window with a predetermined list of possible input entries.

6. The method of claim 1 further comprising inputting billing data for multiple types of cost incurring events in a single user interface.

7. The method of claim 1 further comprising displaying an input billing data screen topmost at the at least one computer.

8. The method of claim 7, wherein displaying an input billing data screen topmost comprises displaying an immovable and unremovable input billing data screen topmost.

9. An apparatus of automatically accounting for call activities on a telephone handset, comprising:
   means for automatically associating use of the telephone handset with a first user;
   means for allowing the first user to perform a call through use of the telephone handset without providing billing information relating to the call;
   means for automatically collecting data concerning the nature of the call;
   means for automatically determining a cost for making the call, defined as unbilled call cost information;
   means for the communicating unbilled call cost information related to the cost of making the telephone call automatically to at least one computer associated with the first user, through a network, the at least one computer and telephone handset being without restriction with respect to physical proximity to each other; and
   means for prompting a billing user who may or may not be the first user to input billing data into a billing database, which billing data is related relating to the unbilled call cost information which was automatically communicated to the at least one computer associated with the first user and which automatically communicated cost information is made available at least in part to the billing user for input of the billing data.

10. The apparatus of claim 9, where the means for automatically associating use of the telephone handset with the user comprises identifying the telephone handset, automatically associating the telephone handset with the user, automatically associating the telephone handset with a computer username, automatically associating a code input in the telephone handset with the user, and automatically associating the user with a computer username.

11. The apparatus of claim 9, wherein the means for a user who may or may not be the first user to input billing data relating to the unbilled call cost information at the at least one computer associated with the first user comprises means for inputting billing data into a single input screen.

12. The apparatus of claim 9, wherein the means for a user who may or may not be the first user to input billing data relating to the unbilled call cost information at the at least one computer associated with the first user comprises means for inputting the billing data in parallel into a plurality of data input windows.

13. The apparatus of claim 12, wherein the means for a user who may or may not be the first user to input billing data relating to the unbilled call cost information in parallel into a plurality of data input windows comprises means for inputting billing data relating to the unbilled call cost information in at least one input window is a drop-down window with a predetermined list of possible input entries.

14. The apparatus of claim 9, wherein the means for inputting billing data relating to the unbilled call information at the at least one user computer comprises means for inputting billing data for multiple types of cost incurring events in a single user interface.

15. The apparatus of claim 9, wherein the means for a user who may or may not be the first user to input billing data relating to the unbilled call cost information at the at least one computer associated with the first user comprises means for displaying an input billing data screen topmost on the at least one computer.

16. The apparatus of claim 15, wherein the means for displaying an input billing data screen topmost comprises means for displaying an immovable and unremovable input billing data screen topmost.

17. A computer readable medium containing instructions for automatically accounting for activities in a network comprising a telephone handset and a computer, the instructions comprising:

automatically associating the telephone handset with a first user;

automatically collecting data concerning the nature of a telephone call;

automatically determining a cost for making the call, defined as unbilled call cost information;

communicating the unbilled call cost information related to the cost of making the telephone call automatically to at least one computer associated with the first user through a network, the at least one computer and telephone handset being without restriction with respect to physical proximity to each other; and prompting a billing user who may or may not be the first user to, provide accounting information for input into a billing database from at least one computer associated with the first user for the call made by the first user after the call is completed.

18. The computer readable medium of claim 17, further comprising providing a cost information of the call based on at least one of the following: a telephone number called, whether the call is outbound or incoming, time the call is made, and duration of the call.

19. The computer readable medium of claim 17, further comprising inputting billing data relating to the unbilled call cost information in parallel into a plurality of data input windows of the at least one computer associated with the first user.

20. The computer readable medium of claim 17, further comprising enforcing the user to provide accounting information relating to the unbilled call cost information at the at least one computer associated with the first user by impeding use of the at least one computer associated with the first user until all call cost information has been entered.

21. The apparatus of claim 9 further comprising means for calculating costs relating to the unbilled call information by administratively classifying each phone call into one of three categories: local, long distance, or international calls.

22. The apparatus of claim 21 where the means for administratively classifying international calls comprises means for identifying international phone calls by selectively configuring international dialing prefixes according to user-determined administrative accounting criteria.

* * * * *